United States Patent
Asao

(10) Patent No.: US 6,939,013 B2
(45) Date of Patent: Sep. 6, 2005

(54) PROJECTION TYPE DISPLAY DEVICE

(75) Inventor: Yasufumi Asao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/690,493

(22) Filed: Oct. 20, 2003

(65) Prior Publication Data

US 2004/0136204 A1 Jul. 15, 2004

(30) Foreign Application Priority Data

Oct. 21, 2002 (JP) .......................................... 2002-305249
Oct. 17, 2003 (JP) .......................................... 2003-358311

(51) Int. Cl.[7] ............................ G03B 21/28; G02B 26/08
(52) U.S. Cl. ............................ 353/98; 353/99; 353/37; 359/197; 359/201; 359/212
(58) Field of Search .......................... 349/62, 202, 197, 349/196, 5, 10, 61; 359/197, 201–203, 212–214, 216–221; 353/34, 31, 37, 81, 85, 89, 97, 98, 99, 101, 122

(56) References Cited

U.S. PATENT DOCUMENTS 5,255,082 A * 10/1993 Tamada ....................... 348/750
5,479,187 A * 12/1995 Chen .......................... 345/102
5,835,249 A * 11/1998 Yamada et al. .............. 359/201
5,969,832 A * 10/1999 Nakanishi et al. ............ 359/15
6,420,000 B1 * 7/2002 Nakamura et al. ........... 428/1.1
6,511,184 B2 * 1/2003 Yamagishi et al. ........... 353/31
6,619,802 B2 * 9/2003 Janssen et al. ................ 353/31
2002/0140908 A1 * 10/2002 Kim et al. ..................... 353/31

OTHER PUBLICATIONS

Ishiguro, et al., "Consideration on Motion Picture Quality of the Hold Type Display with An Octuple–Rate CRT" The Institute of Electronics, Information and Communication Engineers; Technical Report of IEICE, Tokyo, Jun. 1996, pp. 19–26.

* cited by examiner

Primary Examiner—Alan A. Mathews
Assistant Examiner—Andrew Sever
(74) Attorney, Agent, or Firm—Fitzpatrick, Cella, Harper & Scinto

(57) ABSTRACT

A projection type display device includes a light source, a picture information display element, and a light deflection device that deflects light from the light source and irradiates the deflected light on one region of the picture information display element. The light deflection device scans the deflected light over an entire area of the picture information display element and an area outside of an effective display area of the picture information display element.

2 Claims, 11 Drawing Sheets

PROJECTION TYPE DISPLAY DEVICE

BACKGROUND OF THE INVENTION

1. Field of the Invention

The present invention relates to an illumination device and a projection device, which are desirable for use in a liquid crystal projector that with a projection lens magnifies and projects images from a liquid crystal display element (i.e., a liquid crystal panel) onto a screen or wall. In particular, the present invention relates to a liquid crystal projector mainly used to display moving pictures on home theater front projectors or rear projection television.

2. Related Background Art

Various types of liquid crystal projectors that illuminate a liquid crystal panel with a luminous flux from a light source and that with a projection lens magnify and project pictures from the liquid crystal panel based on transmitted light or reflected light on a screen or wall have been suggested in the past, and projectors mainly used for displaying moving pictures are being widely sought in order to expand the market size.

Projectors that have been made public so far belong primarily to two representative types: liquid crystal projectors that use liquid crystal display elements, and projection type display elements (hereinafter called "DLP") based on digital light processing (DLP) that uses a digital mirror device (DMD).

The DLP controls on/off of light by switching at high-speed the angle of a mirror device built on a semiconductor substrate, which controls the proportion of time in the on state within one frame and thereby achieves a gray scale display (i.e., time-division gray scale). On the other hand, such time-division gray scale is not used in liquid crystal display elements other than devices that use ferroelectric liquid crystal. Instead, the liquid crystal display elements utilize a gray scale display method based on analog gray scale, where the value of the voltage applied to the liquid crystal display element is varied according to display picture information in order to display gray scale information.

However, it has become clear from recent research that as long as the two types of devices are driven in the conventional manner, the moving picture high-speed response characteristic that is perceived by humans cannot be obtained from either of them (see "Examination of Moving Picture Quality of Hold, Light Emitting Type Display on an Eight Speed CRT," Shuichi Ishiguro and Taiichiro Kurita, Technical Report of IEICE EID 96-4, p. 19).

According to the report, when viewing pictures on a liquid crystal display element, the human eye does not sense that the pictures are displayed at high-speed even when the time required for the liquid crystal to respond is speeded up to infinitely close to zero. The reason for this is that the conventional liquid crystal display elements are based on the so-called "hold type display" principle. This is a phenomenon in which display information enters the observer's eyes constantly, and the after image effect of eyes causes the pictures to lose sharpness. A "hold type display" is commonly used in a display method that uses the liquid crystal display elements, as well as in a method of displaying gray scale based on time-division in DLP.

As long as this display method is used, the moving picture display performance cannot improve significantly; the research result concludes that effective methods for improving moving picture quality, to the extent that humans sense that a moving picture is displayed at a high-speed, include a method of using a shutter to reduce the time numerical aperture to 50% or less, and a display method employing double speed or higher.

Of the two methods for improving the moving picture quality, the display method employing double speed or higher entails burdening drive circuits, e.g., requiring complicated picture processing such as picture interpolation and requiring even higher speed density such as quad speed (4×) or five speed (5×) in order to obtain a moving picture quality equivalent to that of CRT, and is therefore not a realistic method for achieving true high-speed display performance.

In contrast, the method of reducing the time numerical aperture by using a shutter (a so-called "non-hold type display method") can be realized fairly easily, since the original picture information can be used unaltered.

The non-hold type display method developed for direct view type liquid crystal display elements can be divided into two methods. One is a method of using high-speed liquid crystal to switch the light on/off, which can be achieved by using ferroelectric liquid crystal or optically compensated bend (OCB) mode.

The other method is to turn a backlight on and off. Since this does not require the response speed of the liquid crystal to be especially high-speed, this method can be applied to virtually all liquid crystal modes.

Since the screen size displayed by a projector is much larger than that of a direct view type liquid crystal display element, a moving picture quality in the projection type display is sought to be much higher than that of the direct view type liquid crystal display element in the future. The reason for this is that when the viewing distance remains the same, as the screen size becomes larger, the angle between the human eyes and both ends of the screen becomes larger. As a result, when the same moving picture is displayed, the angular speed with which pictures move becomes larger as the screen becomes larger. However, when the non-hold display method is used on a liquid crystal projector or DLP, the following problems arise:

First, when the method of using high-speed liquid crystal to switch the light on/off is utilized, the utilization rate of light is determined by the proportion of the on time, while the utilization rate of light declines considerably according to the proportion of the off time. This can be dealt with fairly easily with direct view type, such as by increasing the luminance of the backlight, but increasing the luminance of the light source lamp is difficult with projectors.

Consequently, efforts are underway on projectors to realize a display that is even slightly brighter than currently available through a combination of various approaches, such as optics and a display element, in order to increase the utilization rate of light. Due to such circumstances, creating off periods through liquid crystal switching is not a desirable method for projectors, since this would significantly decrease the utilization rate of light.

In the meantime, the method of turning the backlight on and off is a method that can be used only on direct view type liquid crystal elements that utilize a fluorescent tube; turning a light source on and off is impossible with halogen lamps that are generally used on projectors.

Another possible method is to place a shutter wheel in front of a light source and rotate the shutter wheel to create light and darkness from the light source; however, this is equivalent to turning the light on and off through liquid crystal switching and would therefore significantly reduce the utilization rate of light.

It has been pointed out that it is difficult to obtain a sharp display of moving pictures, as well as sufficient dynamic range due to lack of contrast in a display element, with conventional projectors. In other words, conventional projectors lack moving picture quality and dynamic range, which are essential factors for achieving vivid visual expression.

SUMMARY OF THE INVENTION

In view of the above, the present invention relates to a projector that realizes a sharp moving picture display based on a non-hold display and without significantly sacrificing utilization rate of light.

In accordance with an embodiment of the present invention, a projection type display device includes a light source, a picture information display element, and a light deflection device with a function to deflect light from the light source and irradiate the deflected light on one region of the picture information display element. The light deflection device can scan the region on the picture information display element to be irradiated with light over the entire picture information display element within each frame period to thereby project a picture. The picture may be projected on a screen.

In accordance with a preferred embodiment of the present invention, the display element may be line sequentially driven. For example, the line sequential scanning direction may be in a vertical direction of the display element and the light from the light source may be irradiated on the entire display element in a horizontal direction. The light may be irradiated only a part of the display element in the vertical direction, and the entire element may be irradiated with light by scanning in the vertical direction the region to be irradiated with light in appropriate timing within each frame period.

In accordance with another preferred embodiment of the present invention, the light from the light source irradiates only a part of the display element in the horizontal and vertical directions, and the entire element is irradiated with light by scanning in the horizontal and vertical directions the region to be irradiated with light in appropriate timing within each frame period.

In accordance with another preferred embodiment of the present invention, the picture information display element may preferably be a liquid crystal display element, and the liquid crystal display element is either a reflective type liquid panel or a transmissive type liquid panel.

The liquid crystal display element may preferably use a liquid crystal display mode having characteristics in which the average molecular axis of the liquid crystal indicates a monostabilized position when no voltage is applied, and the average molecular axis of the liquid crystal tilts to one direction from the monostabilized position at an angle according to the magnitude of a voltage of a first polarity applied.

Furthermore, the liquid crystal display element may preferably have active elements such as thin film transistors (hereinafter called "TFTs") and is line sequentially scanned.

According to another preferred embodiment of the present invention, the picture information display element is an element that displays picture information by changing the reflecting angle of a mirror surface on each pixel in order to control the light on/off state.

The light deflection device may be in any format as long as it can vary regions that are irradiated with light. A preferred mode for the light deflection device is to use a polygon mirror and to have a function to change the scanning speed according to display picture information. Furthermore, the light deflection device may preferably have a picture processing function to give picture information signals to the picture information display element according to the scanning speed.

Moreover, the light deflection device may preferably have a function to change the intensity of the light emitted from the light source according to the display picture information.

Other objects, features and advantages of the invention will become apparent from the following detailed description taken in conjunction with the accompanying drawings.

DETAILED DESCRIPTION OF THE INVENTION

Referring to FIGS. 1 through 9, preferred embodiments of the present invention will be described below.

First, the display principle for a projection type display element in accordance with a first preferred embodiment of the present embodiment will be described.

Figure 1:
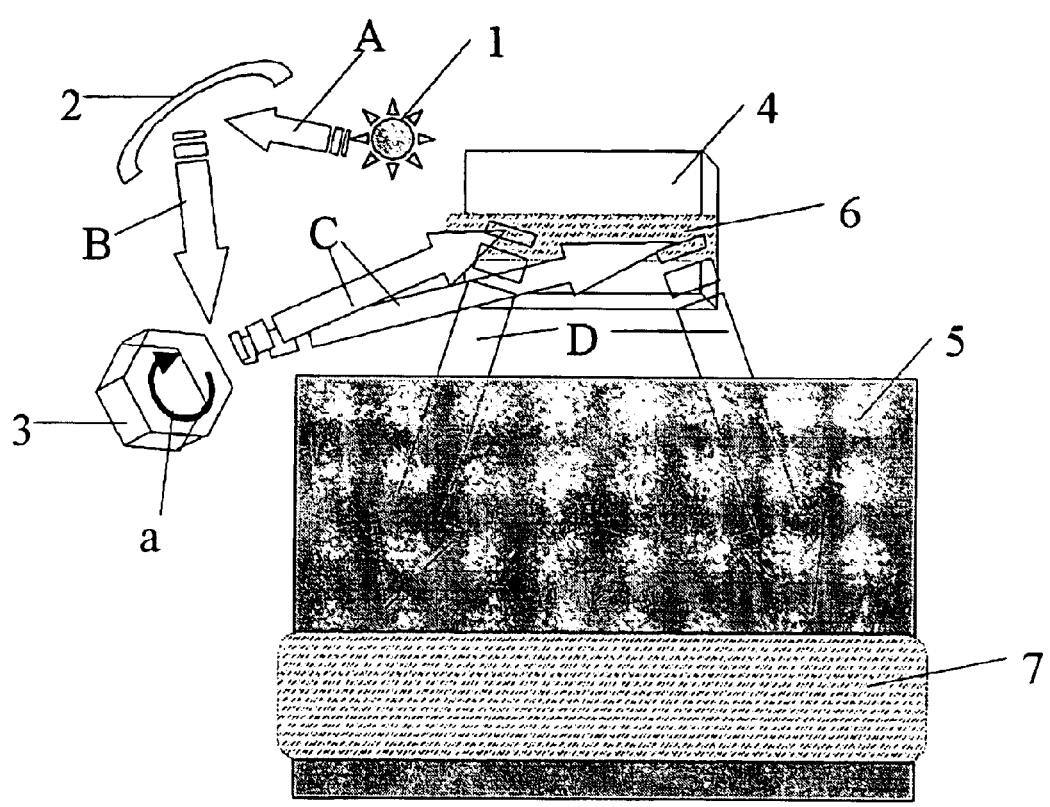
FIG. 1 shows a diagram of the structure of a projection type display device in accordance with a first preferred embodiment of the present invention.

A projection type display device according to the present invention includes a light source 1 that is continuously illuminated, a condensing device 2, an optical deflection device 3 and a picture information display element 4, as shown in FIG. 1. The condensing device 2 condenses the light emitted from the light source 1 to one part of a picture information display element 4, and the optical deflection device 3 changes irradiation positions when the condensed light is irradiated on a part of regions of the picture information display element. Images projected by the projection type display device comprising such elements can be observed when projected on a screen 5. If the display device is a rear projection type, the screen 5 is included in the display device; if the display device is a front projection type, the screen 5 is separate from the display device.

FIG. 1 shows an example in which a polygon mirror is used as a scanning device of the deflection device 3, and the rotation direction of the polygon mirror is indicated as "a."

Next, a light path of the display device according to the present invention will be described. In FIG. 1, arrows labeled A–D indicate a light path. First, the light emitted from the light source 1 follows the light path A and reaches the condensing device 2, which is shown as a concave surface mirror in FIG. 1. Next, the condensed light follows the light path B and reaches the polygon mirror 3, which is the optical deflection device. The light reflected from the scanning device follows the light path C and reaches the display element 4. The light reflected from the display element 4, which is shown as a reflective type display element in FIG. 1, follows the light path D to reach the screen 5, which displays the image.

If the configuration allows scanning only in the vertical direction, such as when only one polygon mirror is used as in FIG. 1, the light may be condensed so that the light is irradiated on the region indicated by a shaded section 6 in FIG. 1, in other words, the light may be condensed in the vertical direction to irradiate only a part of the display element 4 but irradiated to spread in the horizontal direction, in order to irradiate the entire picture information display element 4 using the optical deflection device 3. This causes the reflected light to display a region labeled 7 on the screen 5 in FIG. 1, and the entire picture information display element 4 can be irradiated using one-dimensional scanning by the polygon mirror.

Although a concave surface mirror is used as the condensing device 2 in FIG. 1, the condensing device 2 may be a lens or a combination of a mirror and a lens. Furthermore, instead of using a polygon mirror as the optical deflection device 3, MEMS (Micro-ElectroMechanical Systems) or a method for rotating a prismatic optical element can be used as a device for changing the light path. Although the display element 4 has been described as a reflective type, a transmissive type display element can be used instead. Moreover, although the screen 5 has been described as a rear projection type, a front projection type can be used instead.

Next, referring to FIG. 2, the display by the projection type display device and the timing of the irradiated light scanning will be described. To simplify the description, a projection type liquid crystal display device that uses a nematic liquid crystal display element (e.g., TN mode) that has analog gray scale displayability will be described.

In FIG. 2(a), the horizontal axis indicates time while the vertical axis indicates line electrodes, and let us assume that there are lines from line 1 to line N in the display element. Each solid line 1 indicates the timing at which a gate is selected and the corresponding line is scanned in line sequence from line 1. Line 1 to line N are scanned within a period of one frame, and when the gate selection for the line N is completed, the process returns to line 1 and repeats.

FIG. 2(b) shows the liquid crystal response and the light irradiation timing obtained according to the gate selection timing in FIG. 2(a). The liquid crystal completes its response several milliseconds after a voltage is applied. For example, in FIG. 2(b), a little more than half of one frame time, or approximately 8–10 milliseconds, is spent on response. When the response is completed, condensing and scanning take place so that light is irradiated in the timing represented by each shaded area 2.

Next, a description will be made as to why the configuration and the drive method described above can be used to realize a non-hold display without significantly sacrificing the utilization rate of light.

First, the light source 1 is continuously illuminated, and the light emitted from the light source 1 is irradiated on the picture information display element 4 virtually throughout the entire frame period through the condensing device 2 and the optical deflection device 3. This results in a utilization rate of light that is considerably higher compared to a method of creating off periods through liquid crystal switching or a method of creating light and darkness from the light source through the rotation of a shutter wheel.

Next, the condensed light is deflected, and the entire display element 4 is irradiated within the period of one frame. As a result, any one region of the display element 4 experiences a repeating cycle consisting of a period in which it is irradiated with light and a period in which it is not irradiated with light from the light source 1. On the per pixel level, this results in the realization of the non-hold display.

Furthermore, since the proportion of light irradiation time (i.e., the display duty ratio) within the period of one frame is determined by the extent to which the light condensed by the condensing device 2 can be focused to what area ratio of the display element 4. In other words, the light to be irradiated on the display element 4 is required to be focused only to a certain extent in order to perform an impulse display method comparable to CRTs, and a sharp and superior moving picture quality can be easily obtained when an analog gray scale element is used without having to employ any special contrivances on the display element. On the other hand, when a digital gray scale display element such as DLP is used, since time-division gray scale must be completed within the period indicated by each of the shaded areas 2 (i.e., the period during which light is irradiated) in FIG. 2(b), for example, a switching at a higher-speed than in normal devices becomes required.

By changing the scanning speed according to image signals, the dynamic range of the display element can be substantially expanded. This is described below.

Figure 3:
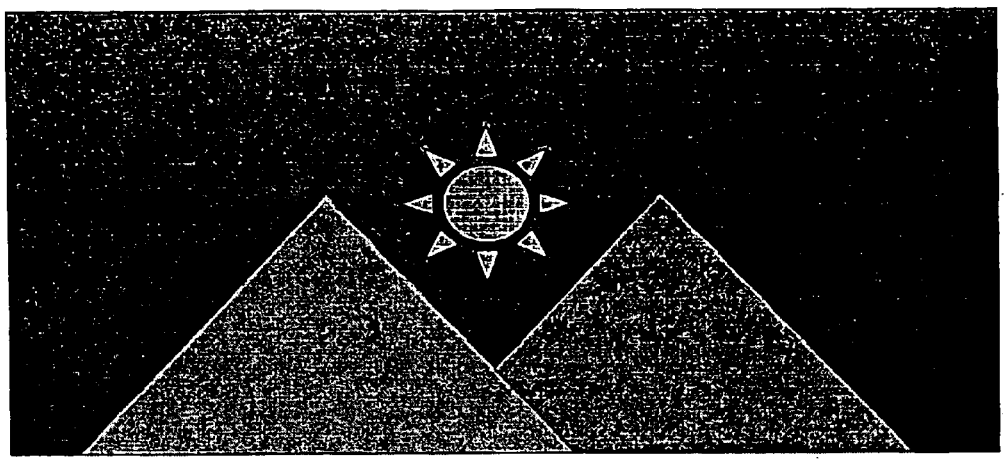
FIG. 3 shows a picture used in evaluation (picture 1).
Figure 4:
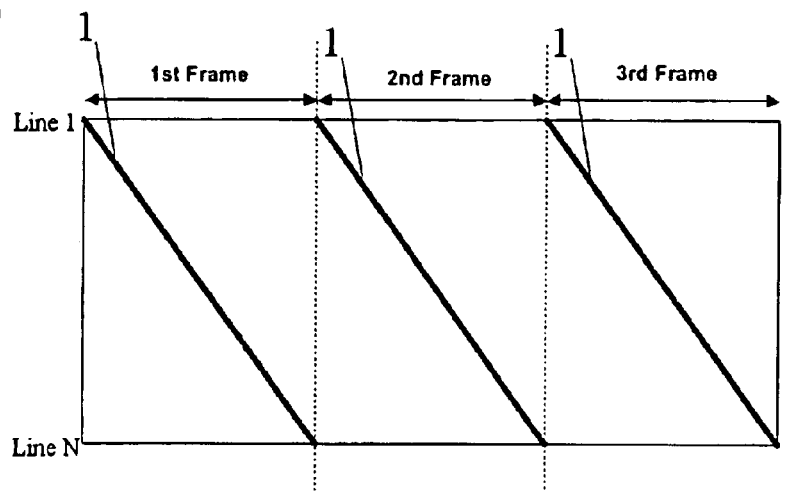
FIGS. 4(a) and (b) shows timing charts of a drive method for driving the projection type display device in accordance with a preferred embodiment of the present invention (timing chart 2).
Figure 4:
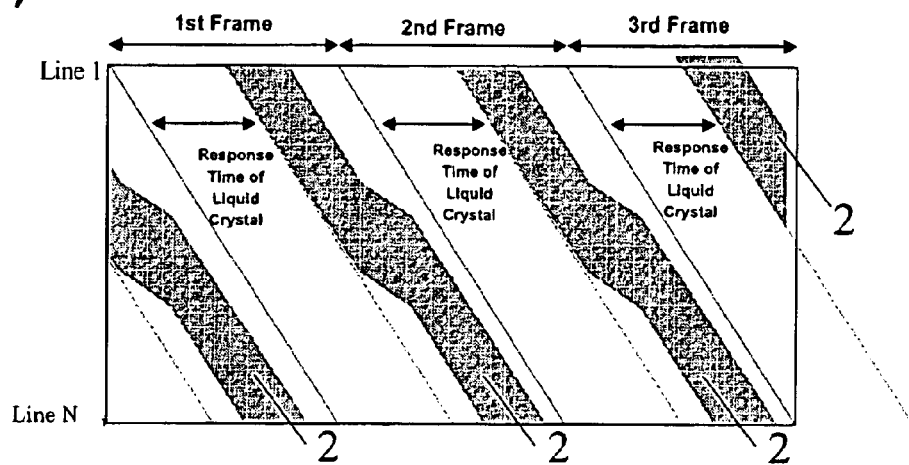

Let us assume that there is image information as shown in FIG. 3. This image shows the sun rising from behind mountains, representing an image source that includes complete darkness and the brightness of the sun that are to be expressed simultaneously. Conventional display elements have limited dynamic range due to insufficient contrast or luminance characteristic and therefore have difficulty expressing realistic images.

By irradiating light as the scanning speed is varied according to the timing shown in FIG. 4(b), bright areas can be displayed more brightly and dark areas can be displayed more darkly, thereby expanding the dynamic range. In other words, shaded areas 2 in FIG. 4(b) indicate the scanning timing of the optical deflection device 3, where the center region of the screen that should be displayed brightly is scanned slowly to provide more luminous flux to the display element 4, while the top and bottom regions of the screen that should be displayed darkly are scanned quickly to reduce the amount of luminous flux provided to the display element 4; this results in a realization of a wide dynamic range and provides a vivid image.

In FIG. 3, the part with the sun is scanned slowly by the light source 1 in order to express the bright sun, but the mountains may be expressed in a uniform half tone. However, even in the same mountain, the part of the mountain that is displayed near selection lines shared by the sun is irradiated with a stronger light, while the part of the mountain that is displayed by selection lines different from those of the sun is irradiated with a weaker light. To address this issue, when the scanning speed of the light source 1 is varied, a picture processing can be performed to convert the gray scale information according to the scanning speed and optimized image information signals can be provided to the display element 4, which results in displaying a uniform half tone.

Figure 5:
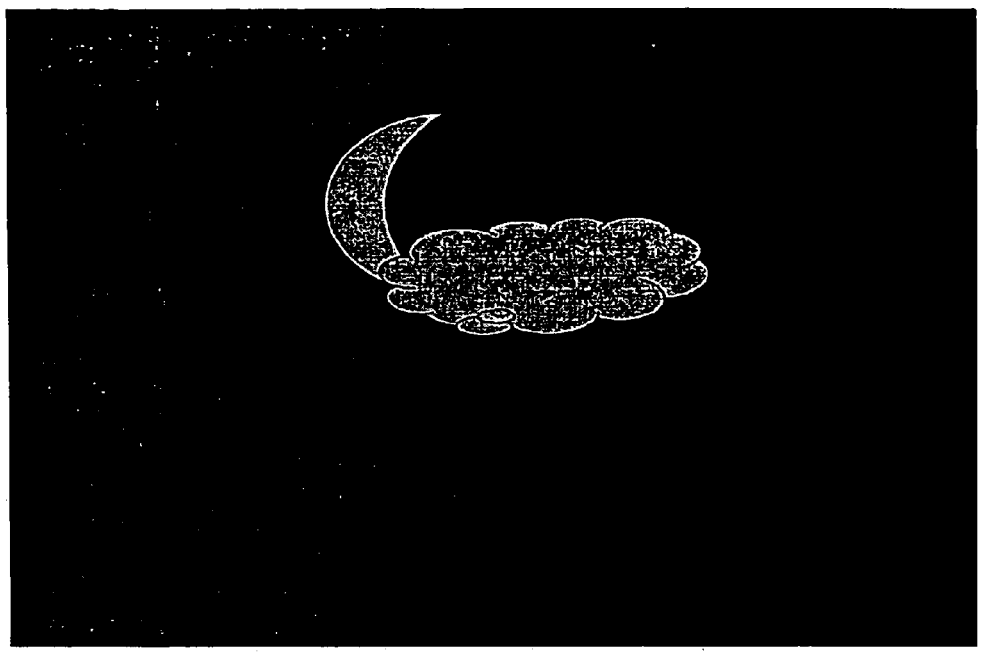
FIG. 5 shows a picture used in evaluation (picture 2).

Next, FIG. 5 shows an image source that is dark overall. It is an image in which a dim moon appears in complete darkness. When an attempt to express such image information is made on a display element having a narrow dynamic range, light leakage can cause the darkness to be expressed somewhat brighter, or gray scale blurring at the extreme low gray scale side can occur; either case makes it impossible to express subtle contrast changes in the darkness. In the image shown in FIG. 5, for example, the detailed shape of the dark cloud would not be expressed and would instead be expressed as a single color, resulting in poor tone reproductioncibility when displayed with low luminance.

However, this problem can be solved with the display element 4 according to the present invention by setting an area outside an effective area of the display element 4 that is to be irradiated with light by the optical deflection control device 3. If there is a large amount of images with dark picture information, it is desirable to set a long period as the period for irradiating the area outside the effective display area.

When the average luminance that is irradiated on a screen is low, the scanning that takes place is fast, as shown in FIG. 6(b). As a result, the period indicated by horizontal lines 3 in FIG. 6(b) is a period during which light is not irradiated on the screen. In other words, such a display method is made achieved by having a configuration in which the light from the light source 1 is irradiated on an area outside the effective display area of the display element 4. Since the light source 1 is continuously illuminated, the light irradiation energy emitted by the light source 1 remains constant at all times; by having a configuration in which the light from the light source 1 is irradiated on the area outside the effective display area of the display element 4, the light energy that contributes to display can be reduced. As a result, the problem of having poor display reproducibility at low luminance does not occur, darkness is expressed as true black, and gray scale blurring at low gray scale does not occur; instead, subtle contrast changes can be expressed in darkness. It is more desirable to perform picture processing as necessary in these circumstances and to give image information signals according to the amount of light irradiated on an area outside an effective display area.

To more effectively condense the light from the light source 1, it is desirable to make the light source 1 itself as close to a point light source as possible.

This method can be favorably applied to a ferromagnetic liquid crystal. Typical ferromagnetic liquid crystal is called Half-V type FLC and is capable of displaying images at high-speed and in analog gray scale; for this reason, its application to high-speed displayable liquid crystal television and full-color display methods utilizing color mixtures based on time-division is anticipated.

Figure 7:
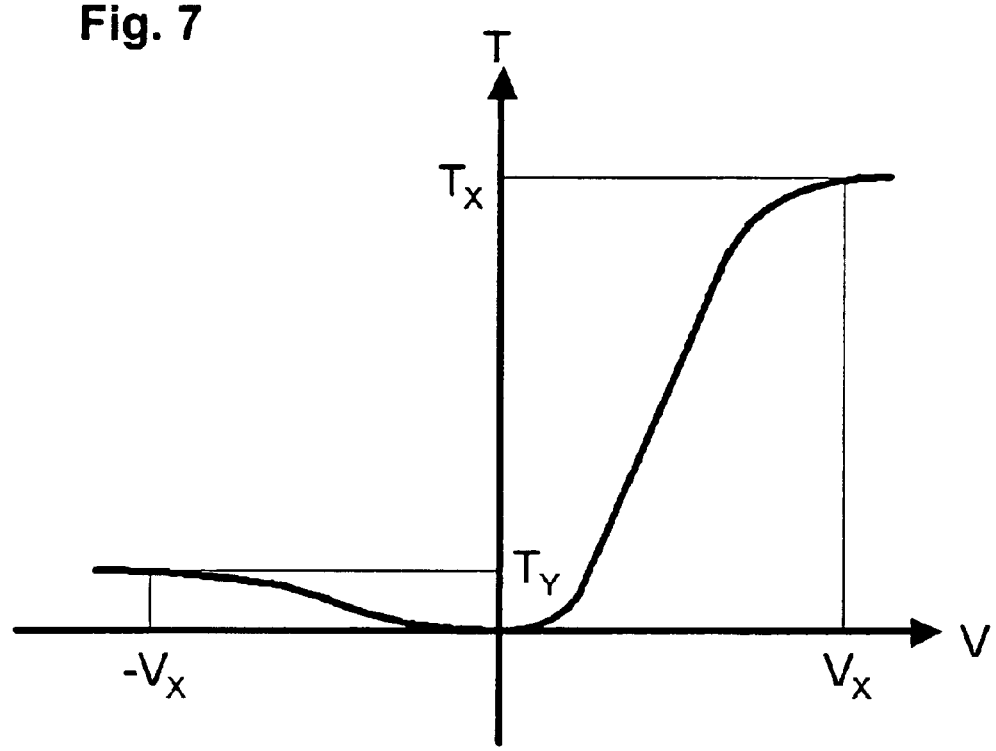
FIG. 7 shows a diagram of the voltage-transmissivity characteristic of a Half-V type FLC element.
Figure 8:
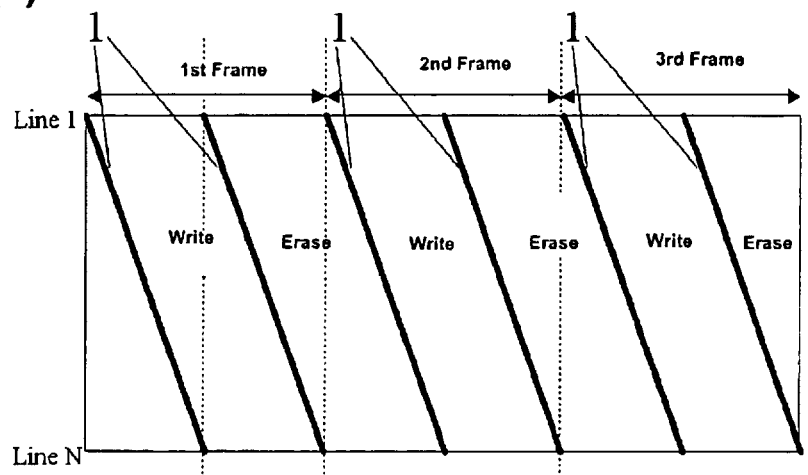
FIGS. 8(a) and (b) show timing charts of a drive method for driving the projection type display device in accordance with a preferred embodiment of the present invention (timing chart 4).
Figure 8:
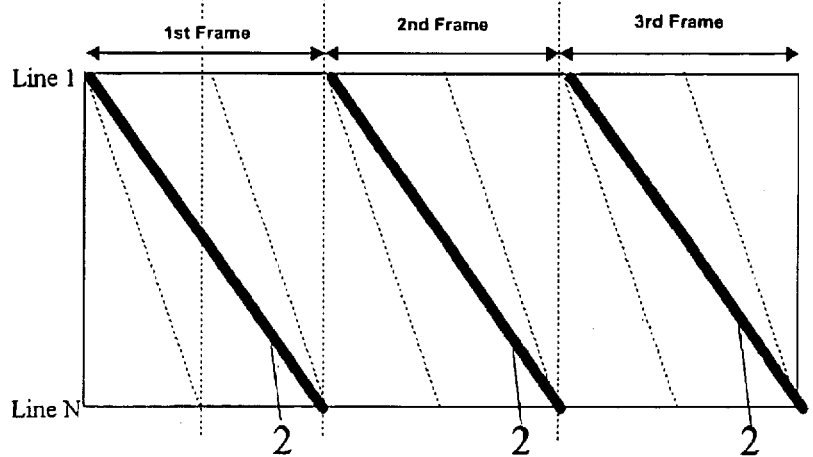

A representative example of the voltage-transmissivity characteristic of a Half-V type FLC element is shown in FIG. 7. Due to the fact that while the transmissivity changes drastically in response to voltage in one polarity, the transmissivity undergoes little change in response to voltage in the opposite polarity, a non-hold display using light on/off through liquid crystal switching can be realized by a simple alternating current drive. For this reason, the Half-V type FLC is considered an effective display mode for direct view type liquid crystal television.

With the picture information display element according to the present invention, scanning by the optical deflection control device 3 with the irradiated light and adjusting as necessary the timing of voltage application to the Half-V type FLC element make it possible to restrain any significant decline in the utilization rate of light, which results in achieving both a bright display and a sharp moving picture quality.

Next, a description will be made as to an example of the liquid crystal display device according to the present invention applied to a Half-V type FLC element. FIG. 8(a) shows scanning of scanning lines on a liquid crystal element. As shown in this drawing, the Half-V type FLC element performs a line sequential drive to divide each frame into two subfields, namely a write field and an erase field, in order to repeat writing and erasing.

In the meantime, FIG. 8(b) is a timing chart of the light source scanning, where thick lines 2 in FIG. 8(b) indicate that the light from the light source is deflected to change the irradiation positions. To scan with light source deflection as shown in this drawing, an area in vicinity of the leading line is irradiated virtually simultaneously or slightly after a selection signal for writing is applied to a leading line gate. Furthermore, an area in vicinity of the final line is irradiated with a condensed light slightly before a selection signal for erasing is applied to the final line gate. As a result, the energy of the light emitted by the light source can be used for display on the screen with virtually no waste. Furthermore, expanding the dynamic range by varying the scanning speed and faithfully reproducing a dark picture by providing a period to irradiate the light to an area outside an effective display area are also applicable to the Half-V type FLC elements, as in the earlier discussion.

Next, referring to FIG. 9, a description will be made as to a projection type display element in accordance with a second preferred embodiment of the present invention through a discussion similar to the above.

Figure 9:
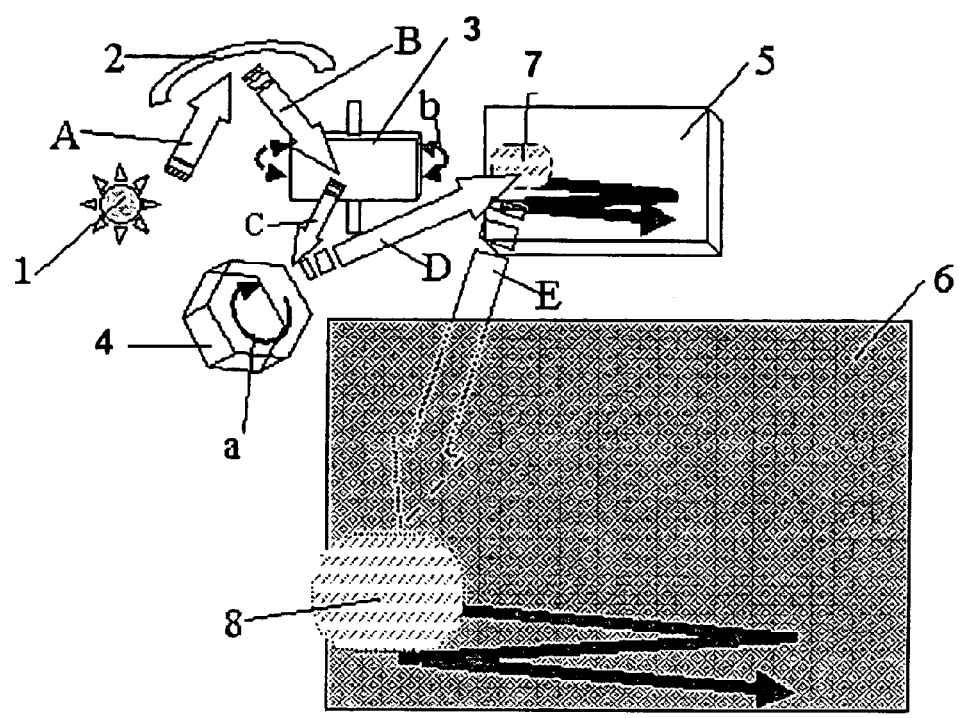
FIG. 9 shows a diagram of the structure of a projection type display device in accordance with a second preferred embodiment of the present invention.

A projection type display device according to the present invention includes a light source 1 that is continuously illuminated, a condensing device 2, optical deflection devices 3 and 4 and a picture information display element 5, as shown in FIG. 9. The condensing device 2 condenses the light emitted from the light source 1 to one part of the picture information display element 5, and the optical deflection devices 3 and 4 change irradiation positions when the condensed light is irradiated on a part of regions of the picture information display element 5. Images projected by the projection type display device having such elements can be observed when projected on a screen 6. If the display device is a rear projection type, the screen 6 is included in the display device; if the display device is a front projection type, the screen 6 is separate from the display device.

FIG. 9 shows an example in which a polygon mirror 4 and a simple harmonic motion mirror surface body 3 are used as a scanning device, and their rotation directions are indicated as "a" and "b," respectively.

Next, the light path of the display device according to the present invention will be described. In FIG. 9, arrows labeled A–E indicate a light path. First, the light emitted from the light source 1 follows the light path A and reaches the condensing device 2, which is shown as a concave surface mirror in FIG. 9. Next, the condensed light follows the light path B and reaches the optical deflection device 3, which is described as the simple harmonic motion mirror surface body in FIG. 9, and follows the light path C to reach the optical deflection device 4, which is described as the polygon mirror. The light reflected from the optical deflection device 4 follows the light path D and reaches the display element 5. The light reflected from the display element 5, which is shown as a reflective type display element in FIG. 9, follows the light path E to reach the screen 6, which displays the image.

Unlike the example in FIG. 1 where only one polygon mirror is used, a two-dimensional, horizontal and vertical scanning can be done in the example shown in FIG. 9; for this reason, the light may be condensed so that the light is irradiated on a region indicated by a shaded section 7 on the picture information display element 5 in FIG. 9. In other words, the light may be condensed in the vertical and horizontal directions to irradiate only a part of the display element 5, in order to irradiate the entire picture information display element 5 with the optical deflection devices 3 and 4. This causes the reflected light to display a region labeled 8 on the screen 6 in FIG. 9, and the entire picture information display element 5 can be irradiated using two-dimensional scanning by the optical deflection devices 3 and 4.

Although a concave surface mirror is used as the condensing device 2 in FIG. 9, it may be a lens or a combination of a mirror and a lens, as in FIG. 1. Furthermore, instead of using the elements in FIG. 9 as the optical deflection device 3 and 4, MEMS or a method for rotating a prismatic optical element can be used as a means for changing light paths. Although the display element 5 is described as a reflective type, a transmissive type display element can be used instead. Moreover, although the screen 6 has been described as a rear projection type, a front projection type can be used instead.

Next, referring to FIG. 10, a description will be made as to the display by the projection type display device and the timing of the irradiated light scanning. To simplify the description, a projection type liquid crystal display device that uses a nematic liquid crystal display element (e.g., TN mode) that has analog gray scale displayability will be described.

Figure 10:
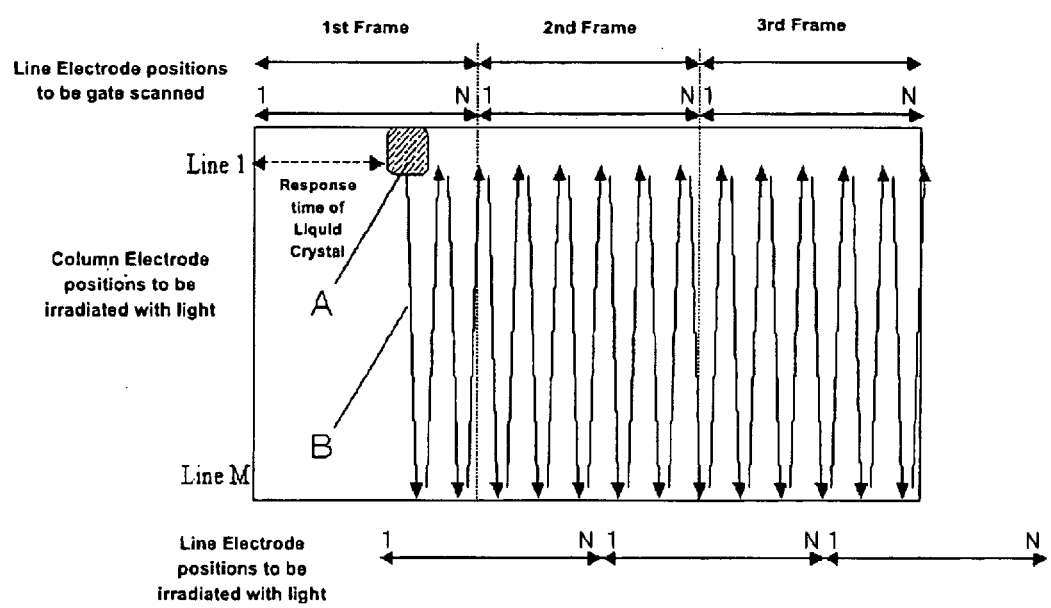
FIG. 10 shows a timing chart of a drive method for driving the projection type display device in accordance with the second embodiment of the present invention (timing chart 5).

In FIG. 10, the horizontal axis indicates time while the vertical axis indicates line electrodes, and let us assume that there are gate lines from line 1 to line N in the display element. Here, let us assume a timing for gate selection similar to the timing in FIG. 2(a), and the lines are scanned in line sequence from line 1 to line N to form one frame. Line 1 to line N are scanned within a period of one frame, and when the gate selection for the line N is completed, the process returns to line 1 and repeats.

In FIG. 10, a shaded section labeled A indicates the location and timing of light irradiation. As in FIGS. 2(a) and (b), the light irradiation on the display element takes place after a gate is selected, a signal voltage is applied to a liquid crystal layer, and the response by the liquid crystal is completed. First, the pixel in the first row, first column, or a region including its vicinity, is irradiated. Next, the optical deflection control device 3 and 4 in FIG. 9 are controlled as necessary in order to follow the direction of an arrow B in FIG. 10 to irradiate the entire display element.

Figure 2:
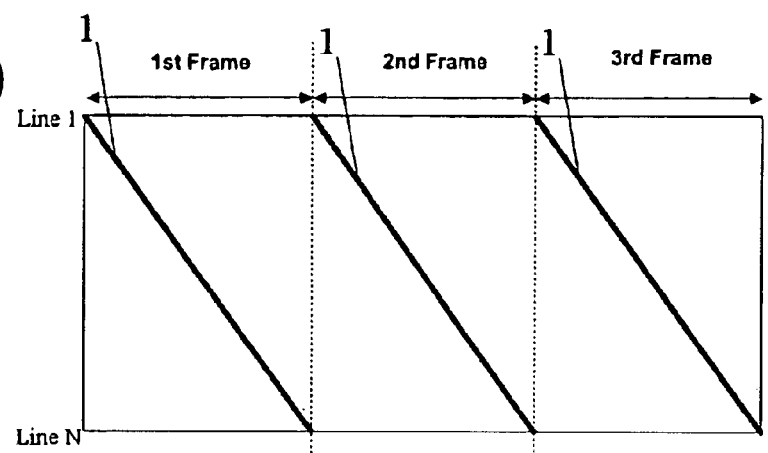
FIGS. 2(a) and (b) show timing charts of a drive method for driving the projection type display device according to the first preferred embodiment of the present invention (timing chart 1).
Figure 2:
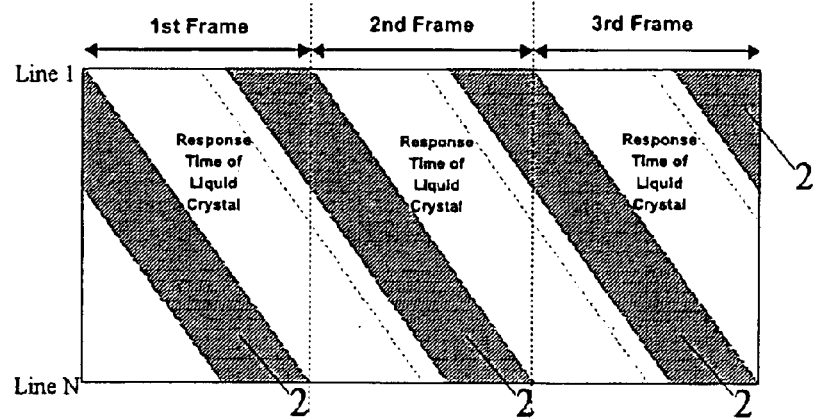

With this method, a high utilization rate of light and a non-hold display can be realized based on a discussion similar to the one given for FIG. 2.

Furthermore, the dynamic range of the display element can be considerably expanded by varying the scanning speed according to image signals, as in the first preferred embodiment. Moreover, the second preferred embodiment can also be applied to the Half-V type FLC based on a discussion similar to the one given for the first preferred embodiment.

The liquid crystal display element may be either reflective or transmissive type.

The reflective type has an advantage in that it can be miniaturized, while the transmissive type has an advantage of easy designing of the optics. The color display method may be based on the use of color filters or on separating the light from the light source into the three primary colors RGB using a dichroic mirror and using a three-panel liquid crystal display element. Or, a field sequential color method that utilizes color mixtures based on time-division may be used.

Various methods can be considered as a method for scanning with condensed light, such as a method of rotating a polygon mirror, MEMS, and a method of rotating a prismatic optical element, but the polygon mirror is the favorable one in terms of lowering cost.

Although the luminous flux emitted by a light source has been described as being constant at all times since it is difficult to perform high-speed modulation on luminous flux emitted by such light sources as high luminance halogen lamps, the luminous energy can be varied within a period of one frame by using such light sources as a high luminance LED or laser that has high response speed; with these, the luminous flux divergence amount can be varied depending on the scanning timing or picture information signal.

As described earlier, a sharp moving picture quality based on a non-hold display and a bright display can both be obtained by configuring the projection type display device as described. In addition, by controlling the scanning speed, a wider dynamic range and faithful reproduction of dark pictures can be realized. Furthermore, by applying the configuration according to the present embodiment to a Half-V type FLC element, which conventionally was not necessarily considered favorable for projector use, a bright display element that does not sacrifice the utilization rate of light can be realized.

As described above, according to the present invention, by configuring a projection type display device comprising a device to condense a light emitted from a light source to one part of a display panel and a device to deflect the condensed light, a sharp moving picture quality based on a non-hold display and a bright display can both be obtained. In addition, by controlling the scanning speed through light source deflection, a wider dynamic range and faithful reproduction of dark pictures can be realized. Furthermore, by applying the configuration according to the present embodiment to a Half-V type FLC element, which conventionally was not necessarily considered favorable for projector use in terms of effective utilization of light source, a bright display element that does not sacrifice the utilization rate of light can be realized.

The following is a description of the present invention in further detail based on embodiment examples.

EMBODIMENT EXAMPLE 1

A projection type liquid crystal display device was built using the optics described in the first preferred embodiment.

The cell used was an active matrix type VGA (640×480) liquid crystal element, 1 inch diagonal (0.6 inch vertical×0.8 inch horizontal). The liquid crystal element was a reflective type liquid crystal element whose reflecting, electrode was on the active matrix substrate side and the counter electrode was a transparent electrode. The liquid crystal used in the reflective type liquid crystal element was a so-called TN mode, which is a mode in which the half tone display state is determined not by the polarity of the voltage applied but by the absolute value level of the voltage applied, as a characteristic of nematic liquid crystal.

A polygon mirror was used as an element for light source scanning. A halogen lamp was used as a light source, so that the light emitted from the light source traveled via the polygon mirror and was condensed by a lens on a region defined by 5 mm vertical (but the entire region in the horizontal direction) of the liquid crystal panel.

The projection type liquid crystal display device thus obtained was displayed according to the timing described in FIG. 2, and the moving picture quality was evaluated.

The evaluation of the moving picture quality was a subjective evaluation by approximately 10 non-experts and made on a scale of 1 to 5 (grade), whose definitions are described below. The pictures used in the evaluation were three types (a skin tone chart, a sightseeing sign, and a yacht harbor) from BTA's high definition standard pictures (still images), and 432×168 pixels were cut out from the center part of each for use in the evaluation.

Next, these pictures were made to move at a constant speed of 6.8 deg/sec, which is the common moving speed for television programs, to create moving pictures, and the blurring of the pictures was evaluated:

Grade 5: No blurring on the periphery of the screen at all, sharp and excellent moving picture quality.
Grade 4: Blurring on the periphery of the screen almost not noticeable.
Grade 3: Blurring on the periphery of the screen observed, and small characters are difficult to recognize.
Grade 2: Blurring on the periphery of the screen prominent, and even large characters are difficult to recognize.
Grade 1: Blurring prominent over the entire screen, and the original picture is almost unrecognizable.

The output from the picture source computer was at a picture rate of 60 frames per second in progressive scanning.

The result indicated that no blurring was observed on the periphery of the moving pictures at all. Subjective evaluation of the degree of blurring on the periphery was 5 on a scale of 1 to 5. Furthermore, it was confirmed that a satisfactorily bright display was obtained.

When the evaluation was done using a general CRT, all evaluators gave 5, which is excellent, on a scale of 1 to 5; when the evaluation was done with a liquid crystal projector using normal optics and with the same liquid crystal used in the present embodiment example, the evaluation results were 2–3 on a scale of 1 to 5.

EMBODIMENT EXAMPLE 2

The liquid crystal display device described in the embodiment example 1 was used for display. The picture used in this case was an image of the sun rising from behind dark mountains, as shown in FIG. 3. In this case, a display in which the scanning speed was varied according to picture information (evaluation picture 1), as in FIG. 4, and a display in which the scanning speed remained constant at the scanning speed shown in FIG. 2 (evaluation picture 2), as in the scanning in the embodiment example 1, were compared.

The result indicated that the evaluation picture 1 had striking contrast between dark and bright areas and therefore successfully realized a vivid image. On the other hand, the evaluation picture 2 gave an impression of slightly lacking contrast. The evaluation picture 1 had slight luminous unevenness on the surface of the mountains, but when an information signal with picture processing that took into consideration the amount of light irradiated was provided, the result was a natural and vivid image with no display luminous unevenness.

EMBODIMENT EXAMPLE 3

Figure 6:
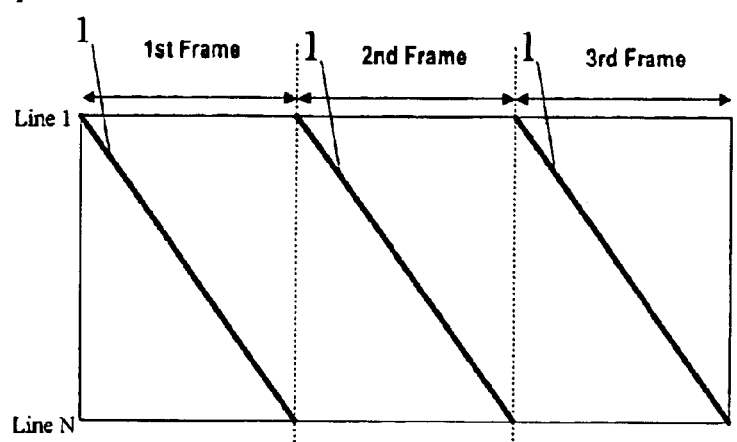
FIGS. 6(a) and (b) show timing charts of a drive method for driving the projection type display device in accordance with a preferred embodiment of the present invention (timing chart 3).
Figure 6:
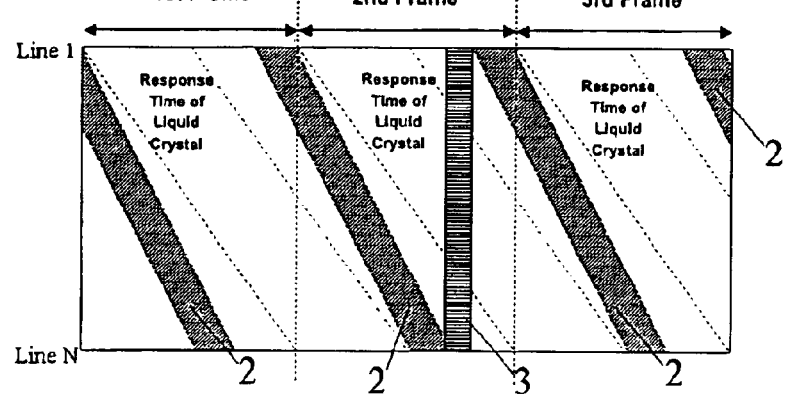

The liquid crystal display device described in the embodiment example 1 was used for display. The polygon mirror was altered from the embodiment example 1 and set to irradiate light on an area outside an effective display area. The picture used for display in the present embodiment example was a dark image of a dim moon appearing in complete darkness, as in FIG. 5. A display in which a light source scanning was performed so that a period for irradiating an area outside the effective display area was provided within one frame and other periods were used for display (evaluation picture 3), as shown in FIG. 6, and a display in which the light source scanning speed remained constant (evaluation picture 4), as in the scanning according to the embodiment example 1, were compared.

The result indicated that although subtle contrast differences in an extremely dark picture were faithfully reproduced in the evaluation picture 3, the evaluation picture 4 gave the impression of slightly lacking darkness in black areas and insufficient gray scale resolution at low gray scale.

EMBODIMENT EXAMPLE 4

The liquid crystal material and the orientation processing method used in the liquid crystal element were altered to build a liquid crystal display device similar to the one in the embodiment example 1. The following is a description of the procedure:

Preparation of a Liquid Crystal Composition:

First, the following liquid crystal compounds were mixed according to the weight ratio indicated to the right of each compound, and a liquid crystal composition LC-1 was prepared.

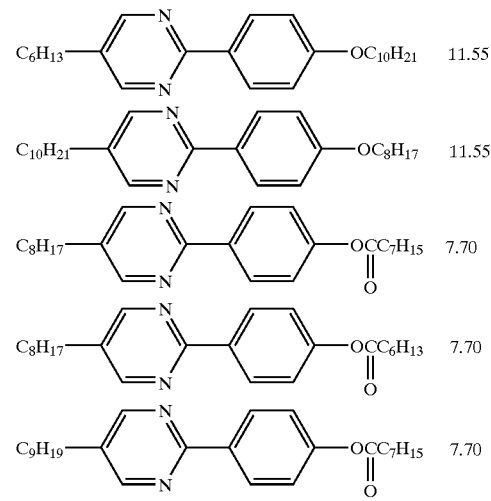

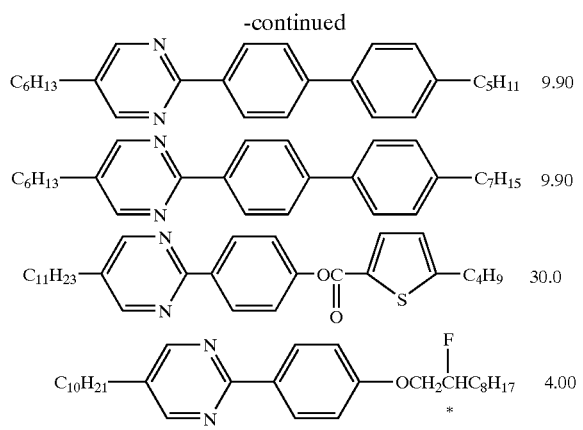

The physical parameters of the liquid crystal composition LC-1 are as follows:

86.3 61.2–7.2

Phase transition temperature (OC): ISO.→D→Ch SmC*→Cry
Spontaneous polarization (30° C.): Ps=2.9 nC/cm$^2$
Cone angle (30° C.): θ=23.3° (100 Hz, ±12.5V, substrate gap 1.4 μm)
Spiral pitch in SmC*phase (30° C.): 20 μm or more
Making a Liquid Crystal Cell:

Substrates similar to the ones in the embodiment example 1 were used. A commercially available TFT liquid crystal orientation film (SE7992 by Nissan Kagaku) was coated as orientation control films based on a spin coat method to a film thickness of 150 Å each. Orientation control films 6a, 6b were rendered a rubbing processing (uniaxial orientation processing) with cotton cloths. For the rubbing processing, a rubbing roll 10 cm in diameter and with cotton cloths affixed on its outer conference surface was used; the stuffing amount was 0.7 mm, the feed rate was 10 cm/sec, the number of revolutions was 1000 rpm, and the number of feeds was 4. The rubbing direction was set to make both the top and bottom substrates parallel with the source line.

Next, silica beads (spacers) with average particle size of 1.5 μm were scattered on one of the substrates; the substrates were affixed so that the rubbing processing direction on one of the substrates was anti-parallel to the rubbing processing direction of the other; and a cell with uniform substrate gaps was obtained.

The liquid crystal composition LC-1 was poured at the Ch phase temperature into the cell made through the process described above; the cell with the liquid crystal composition LC-1 was cooled to a temperature at which the liquid crystal indicated a chiral smectic liquid crystal phase (however, the cooling rate was 1° C./min); and a ±5V offset voltage (direct current voltage) was applied when the liquid crystal's phase transitioned from the Ch phase to the SmC* phase (within the temperature range of Tc−2° C. through Tc+2° C.).

Next, a liquid crystal panel P1 was actually driven and its moving picture quality was evaluated. For this, the picture display was based on the timing chart shown in FIG. 8. As a result, in the subjective evaluation of the degree of blurring on the periphery, as in the embodiment example 1, 5 was given on a scale of 1 to 5. In addition, it was confirmed that satisfactorily bright display was obtained.

When the liquid crystal element was applied to a conventional liquid crystal projector that does not use light source scanning, the subjective evaluation of the degree of blurring on the periphery was 4 or 5 on a scale of 1 to 5, which is a slightly inferior result of a moving picture quality to the moving picture quality obtained with scanning, and a bright display could not be obtained since the brightness was reduced by half.

EMBODIMENT EXAMPLE 5

Using the cell configuration in the embodiment example 4, an experiment to vary the light source scanning speed according to picture information and to provide a period for irradiating an area outside an effective display area, as in embodiment examples 2 and 3, was conducted. As a result, it was confirmed that results similar to those gained in the embodiment examples 2 and 3 could be obtained.

EMBODIMENT EXAMPLE 6

A projection type liquid crystal display device using the optics described in the second preferred embodiment was built. The cell used was the same as in the display device in the embodiment example 1.

Two polygon mirrors were used as elements for light source scanning, so that optics in which the light source can be scanned in two axial directions, vertical and horizontal, was obtained. A halogen lamp was used as a light source, so that the light emitted from the light source traveled via the polygon mirrors and was condensed by a lens on a region defined by 5 mm vertical×5 mm horizontal of the liquid crystal panel.

Figure 11:
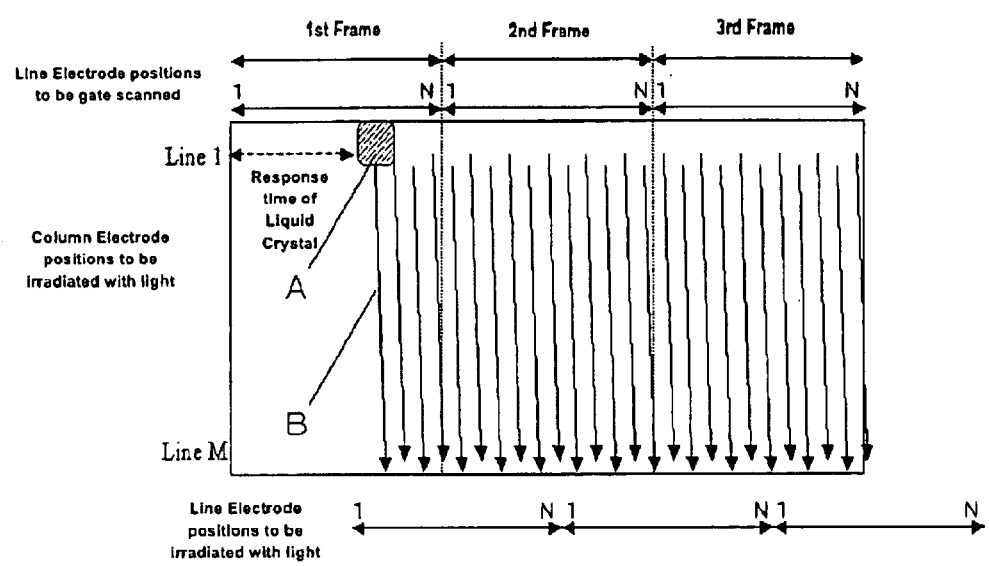
FIG. 11 shows a timing chart of a drive method for driving the projection type display device in accordance with the second preferred embodiment of the present invention (timing chart 6)

The projection type liquid crystal display device thus obtained was displayed according to the timing shown in FIG. 11, and the moving picture quality was evaluated as in the embodiment example 1.

The result indicated that no blurring was observed on the periphery of the moving pictures at all. Subjective evaluation of the degree of blurring on the periphery was 5 on a scale of 1 to 5. Furthermore, it was confirmed that a satisfactorily bright display was obtained.

EMBODIMENT EXAMPLE 7

The display device used in the embodiment example 6 was used to conduct an experiment to vary the scanning signal according to picture signals, as in embodiment examples 2 and 3. As a result, it was confirmed that a wide dynamic range as in the embodiment examples 2 and 3 could be obtained.

EMBODIMENT EXAMPLE 8

The liquid crystal material and the orientation processing method used in the liquid crystal element were replaced with those used in the embodiment example 4, and a liquid crystal display device similar to the one in the embodiment example 6 was built. As a result, it was confirmed that excellent results both in the moving picture quality and brightness could be obtained, as in the embodiment example 4. In addition, when the scanning speed was varied according to the picture signal on this display device, as in the embodiment example 5, results similar to those in the embodiment example 7 were obtained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A projection type display device comprising:
   a light source;
   a picture information display element; and
   a light deflection device that deflects light from the light source and irradiates the deflected light on one region of the picture information display element,
   wherein the light deflection device scans the deflected light over an entire area of the picture information display element and an area outside of an effective display area of the picture information display element.

2. A projection type display device according to claim 1, wherein a scanning speed of the light deflection device is changed according to picture information and a period in which the area outside of the effective display area is irradiated with the light is controlled according to a luminance level of the picture information.

* * * * *

UNITED STATES PATENT AND TRADEMARK OFFICE
CERTIFICATE OF CORRECTION

PATENT NO. : 6,939,013 B2  
APPLICATION NO. : 10/690493  
DATED : September 6, 2005  
INVENTOR(S) : Yasufumi Asao Page 1 of 1

It is certified that error appears in the above-identified patent and that said Letters Patent is hereby corrected as shown below:

<u>COLUMN 13</u>:

Line 23, "(OC):ISO.→D→Ch" should read --(°C):ISO.→Ch→--.

Signed and Sealed this

First Day of August, 2006

JON W. DUDAS  
*Director of the United States Patent and Trademark Office*